Dec. 10, 1957 C. C. SLATER 2,815,740
HYDRAULIC TAPPET
Filed July 17, 1956
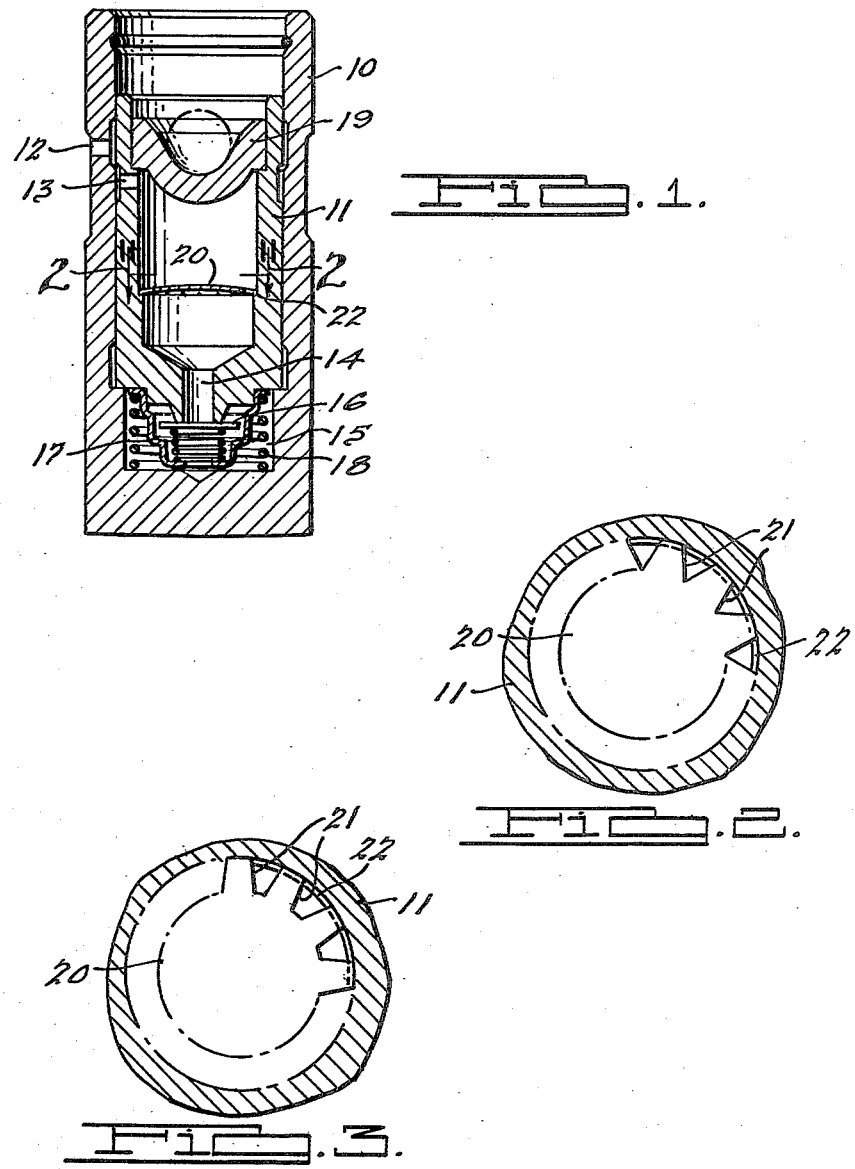
INVENTOR.
Carl C. Slater.
BY E. C. McRae
J. R. Faulkner
G. H. Oster
ATTORNEYS.

United States Patent Office 2,815,740
Patented Dec. 10, 1957

2,815,740
HYDRAULIC TAPPET

Carl C. Slater, Dearborn, Mich., assignor to Ford Motor Company, Dearborn, Mich., a corporation of Delaware Application July 17, 1956, Serial No. 598,374

7 Claims. (Cl. 123—90)

This application relates to a hydraulic tappet structure and especially to one designed to eliminate undesirable entrapment of gas in the working fluid. Hydraulic tappets are conventionally used in internal combustion engines because of their ability to continually and automatically compensate for dimensional changes in the components of the valve train and by so doing to eliminate noise from this source.

In conventional valve train employing hydraulic tappets reliance is placed upon an entrapped column of oil to transmit to the valve push rod force originating in the camshaft. To be completely effective this oil column must be devoid of emulsified gas because the inherent elasticity of gas makes the action of the tappet plunger spongy. The instant invention has been designed specifically to maintain the entrapped oil column free from gas. The invention may be readily understood by reference to the drawings in which, Figure 1 is a vertical section of a typical hydraulic tappet modified to include the structure of this invention, and Figure 2 is a cross section of the structure shown in Figure 1 taken along the line A—A showing one form of the invention, and Figure 3 is a similar section along the line A—A showing another form of the invention.

A typical hydraulic tappet as shown in Figure 1 comprises an external member 10 reciprocable within an appropriate bore in the engine block. The lower surface of external member 10 conventionally is actuated by a cam carried upon the cam shaft. Cylindrical external member 10 normally contains an internal member 11 which is capable of relative axial motion with respect to cylindrical external member 10. External member 10 is provided with a drilled opening 12 and internal member 11 with drilled opening 13. Drilled opening 13 empties into the hollow portion of internal member 11. Drilled openings 12 and 13 are designed to conduct lubricating oil which is the working hydraulic fluid from the lubricating system of the engine into the interior of internal member 11. This oil flows from the interior of internal member 11 through passageway 14 into cavity 15. This cavity 15 is defined by the external member 10 and the internal member 11. Valve 16 biased by spring 17 permits the flow of oil from passageway 14 into cavity 15 but does not permit a reverse flow.

Spring 18 within cavity 15 tends to cause internal member 11 to slide axially within external member 10 in a direction which will enlarge the capacity of cavity 15.

When an engine employing hydraulic tappets is started oil enters cavity 15 via drilled openings 12 and 13, passageway 14 and valve 16. The oil entrapped in cavity 15 by valve 16 then serves to transmit the thrust from external member 10 to internal member 11 through the entrapped oil. A cap 19 is provided on the upper end of internal member 11 and in turn supports and imparts thrust to the valve push rod.

The instant invention departs from conventional structure by providing a shoulder 22 on the inner surface of internal member 22 which supports a deflector 20. This deflector may take the form of a serrated conical disc as can be seen in Figures 2 and 3. Deflector 20 has an imperforate central area and a series of notches 21 on its periphery. Figure 2 shows a V-shaped notch and Figure 3 an alternative blunt based notch. These are only typical structures and any structure providing for a flow of oil immediately adjacent the inner surface of internal member 11 and preventing such flow near the center of internal member will serve equally well.

It has been seen by observation of transparent models that oil flowing from the interior of internal member 11 into passageway 14 in the absence of deflector 20 tends to create a whirlpool or vortex which entraps air. This air flows downward against the force of gravity into cavity 15. Since internal member 11 and external member 10 are extremely close fits a considerable period of time must elapse before this objectionable air can escape through the clearance between these members which is its only path of escape.

The provision of deflectors 20 within the central portion of internal member 11 causes the oil destined to flow through passageway 14 to descent along the inner wall of internal member 11 and prevents the formation of these whirlpools or vortices and so effectively excludes air from cavity 15.

While deflector 20 has been shown in the form of a serrated conical disc placed against shoulder 22 it is to be understood that any similar structure in which the oil is prevented from flowing centrally from internal member 11 into cavity 15 will improve the action of the tappets.

I claim as my invention:

1. A hydraulic tappet comprising an external member reciprocable in an engine, and an internal member carried in said external member, said internal member and external member together defining a cavity in which liquid is trapped, said internal member being provided with a passageway to permit oil to enter the cavity and said internal member being provided with a deflector tending to cause oil flowing axially in the internal member to flow adjacent the walls of said member.

2. A hydraulic tappet comprising an external member reciprocable in an engine, an internal member carried in said external member, said internal and external members together defining a cavity in which liquid is trapped, said internal member being provided with a passageway to permit oil to enter the cavity, and said internal member being provided with a deflector which deflector has an imperforate central portion and at least one opening adjacent its periphery.

3. A hydraulic tappet comprising an external member reciprocable in an engine, an internal member carried in said external member, said internal and external members together defining a cavity in which liquid is trapped, said internal member being provided with a passageway to permit oil to enter the cavity, and said internal member being provided with a deflector which deflector has an imperforate central portion and then a plurality of openings adjacent its periphery.

4. A hydraulic tappet comprising an external member reciprocable in an engine, an internal member carried in said external member, said internal and external members together defining a cavity in which liquid is trapped, said internal member being provided with a passageway to permit oil to enter the cavity, and said internal member being provided with a deflector which deflector has an imperforate central portion and a plurality of notches cut in its periphery.

5. A hydraulic tappet comprising an external member reciprocable in an engine, and an internal member carried in said external member, said internal member and external member together defining a cavity in which liquid is trapped, said internal member being provided with a passageway to permit oil to enter the cavity and said internal member being provided with a deflector oriented normal to the axis of the tappet and tending to cause oil flowing axially in the internal member to flow adjacent the walls of the chamber.

6. A hydraulic tappet comprising an external member reciprocable in an engine, and an internal member carried in said external member, said internal member and external member together defining a cavity in which liquid is trapped, said internal member being provided with a passageway to permit oil to enter the cavity and said internal member being provided with a deflector adjacent the passageway tending to cause oil flowing axially in the internal member to flow adjacent the walls of said member.

7. A hydraulic tappet comprising an external member reciprocable in an engine, and an internal member carried in said external member, said internal member and external member together defining a cavity in which liquid is trapped, said internal member being provided with a passageway to permit oil to enter the cavity and said internal member being provided with a deflector adjacent the passageway, said deflector having an imperforate central portion and openings adjacent its periphery tending to cause oil flowing axially in the internal member to flow adjacent the walls of said member.

References Cited in the file of this patent

UNITED STATES PATENTS

| | | |
|---|---|---|
| 2,752,901 | Bergmann | July 3, 1956 |
| 2,766,745 | Purchas | Oct. 16, 1956 |